United States Patent [19]

Consiglieri et al.

[11] Patent Number: 5,592,485
[45] Date of Patent: Jan. 7, 1997

[54] CONNECTION SYSTEM BETWEEN A MASTER AND SLAVE PROCESSING UNITS

[75] Inventors: Franco Consiglieri, Piacenza; Arturo Wolfsgruber, Milan; Sandro Storti, Sesto San Giovanni, all of Italy

[73] Assignee: SGS-Thomson Microelectronics S.r.l., Italy

[21] Appl. No.: 876,127

[22] Filed: Apr. 29, 1992

Related U.S. Application Data

[63] Continuation of Ser. No. 519,287, May 4, 1990.

[30] Foreign Application Priority Data

May 4, 1989 [IT] Italy ...................... 67328/89

[51] Int. Cl.⁶ ........................... G05B 19/00; B60R 16/02
[52] U.S. Cl. ...................... 340/825.06; 370/360
[58] Field of Search ................... 370/85.1, 85.2, 370/85.3, 85.8, 85.9, 58.1, 58.2, 94.1, 94.3, 95.1, 95.3; 340/825.22, 825.5, 825.51, 825.52, 825.08, 825.06, 825.07

[56] References Cited

U.S. PATENT DOCUMENTS

| | | | |
|---|---|---|---|
| 2,723,309 | 11/1955 | Lair et al. | 370/85.4 |
| 4,587,487 | 4/1986 | Hesse et al. | 370/85.6 |
| 4,628,308 | 12/1986 | Robert | 370/85.1 |
| 4,715,031 | 12/1987 | Crawford et al. | 370/94.1 |
| 4,736,365 | 4/1988 | Stern | 370/67 |
| 4,736,407 | 4/1988 | Hasegawa et al. | 370/67 |
| 4,740,955 | 4/1988 | Litterer et al. | 370/67 |
| 4,780,620 | 10/1988 | Hogberg et al. | 370/85.1 |
| 4,847,756 | 7/1989 | Ito et al. | 370/85.1 |
| 4,887,263 | 12/1989 | Steely | 370/85.1 |
| 4,920,532 | 4/1990 | Wroblewski | 370/85.1 |
| 4,926,417 | 5/1990 | Futami | 370/55.1 |
| 4,942,571 | 7/1990 | Moller et al. | 370/94.3 |
| 4,949,336 | 8/1990 | Hamada et al. | 370/85.2 |
| 4,951,281 | 8/1990 | Mato et al. | 370/94.1 |
| 4,988,989 | 1/1991 | Goto | 370/85.1 |

FOREIGN PATENT DOCUMENTS

| | | |
|---|---|---|
| 0013103 | 7/1980 | European Pat. Off. . |
| 0051849 | 5/1982 | European Pat. Off. . |
| 0143650 | 6/1985 | European Pat. Off. . |
| 9106447 | 5/1991 | WIPO . |

*Primary Examiner*—Douglas W. Olms
*Assistant Examiner*—Dang Ton
*Attorney, Agent, or Firm*—Gifford, Krass, Groh, Sprinkle, Patmore, Anderson & Citkowski, P.C.

[57] ABSTRACT

A connection system of the multiplex type between at least one master processing unit and slave units, in particular associated with electrical devices in a vehicle for activating or controlling at least one electrically functioning component in the corresponding device, the slave units being connected in groups to the master unit by means of corresponding communication channels common to the units of each group, and in which the master unit includes logical means for controlling the exchange of communications between the various channels; in particular these logical means include a microprocessor and control corresponding first blocks enabling transmission on such communication channels and corresponding second blocks enabling communication between the abovementioned channels.

12 Claims, 4 Drawing Sheets

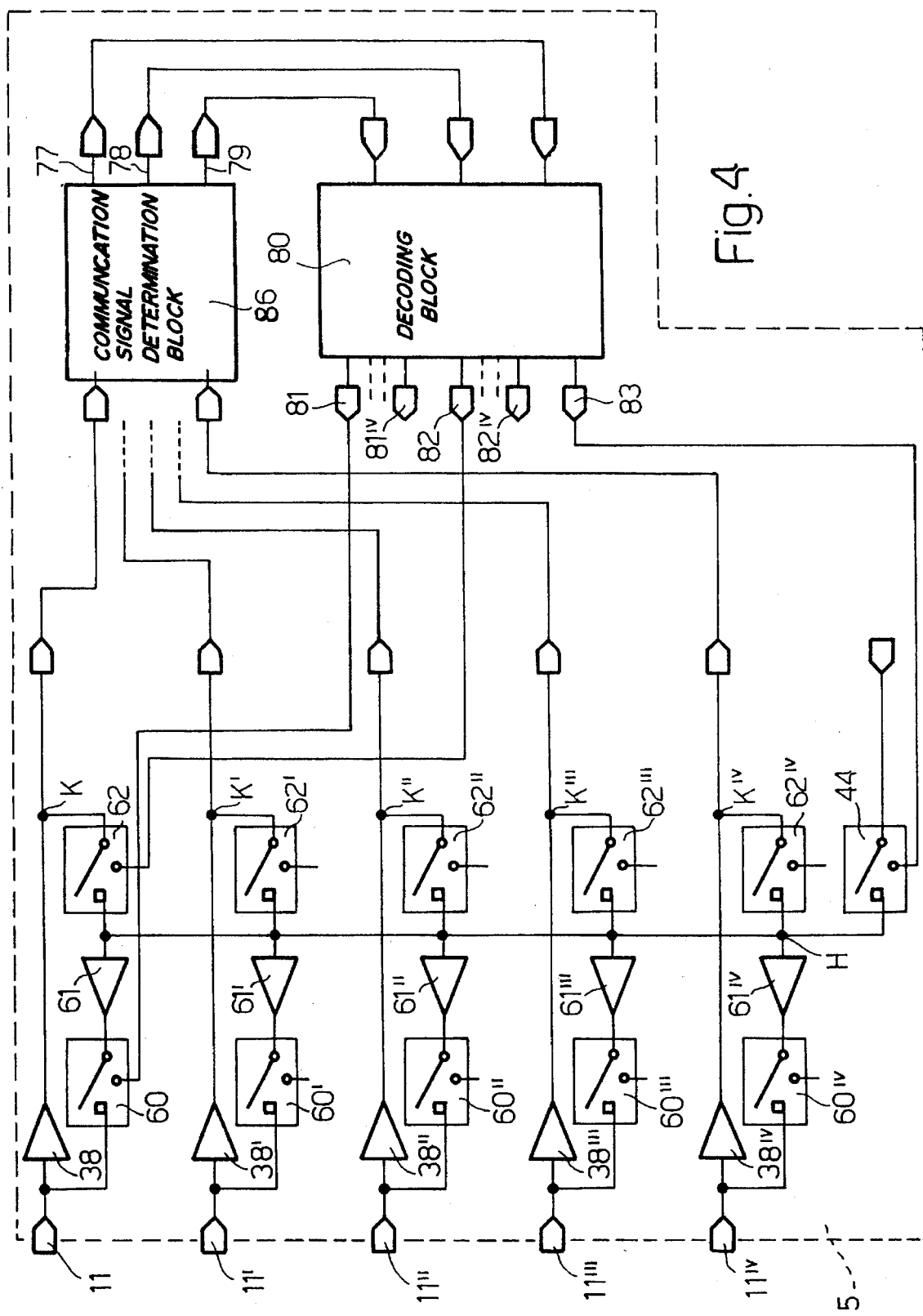

CONNECTION SYSTEM BETWEEN A MASTER AND SLAVE PROCESSING UNITS

This is a continuation of application Ser. No. 07/519,287 filed on May 4, 1990, now abandoned.

BACKGROUND OF THE INVENTION

This invention relates to a connection system of the multiplex type, i.e. with communication channels accessible to a plurality of users provided between a master processing unit and groups of slave units connected to one of such channels respectively, with the possibility of controlling the exchange of communication between the channels. In particular the connection system according to this invention can be applied to a plurality of units associated with the electrical devices in a vehicle, and especially for the activation and control of electrical devices associated with a motor vehicle door, such as for example the window winding device, the door locking device, the device actuating the various electrical components of an outside rear-view mirror, and the device with manual control switches for control of the components in the various abovementioned devices as described in Italian application no. 67158-A/89 lodged on the 7 Mar. 1989 entitled: "Activation and control system for a plurality of electrical devices in a vehicle".

As is known, in master-slave communication systems each slave unit may be connected to the master processing unit by its own communication line. This arrangement however results in a high number of input-output ports in the master unit, and a high number of communication lines, as a result of which the complexity of the cabling is a disadvantage in comparison with systems of the multiplex type. Systems have therefore been proposed in which all the slave units are connected to the master unit by a single communication bus. A fault on this line however compromises the functioning of the entire system.

SUMMARY OF THE INVENTION

The object of this invention is to provide a connection system of the multiplex type between a master processing unit and slave units in which the number of communication lines is relatively reduced and at the same time a fault on one such line does not put the entire system out of service, so as to overcome the disadvantages mentioned above with particular advantage in application of the connection system between a plurality of electrical devices in a vehicle, where it is important to construct a relatively simplified system but with a high guarantee of satisfactory functioning in order to reduce production and assembly costs.

On the basis of this invention a connection system has been provided between at least one master processing unit and slave units characterised in that the said slave units are connected with the said master unit in groups by means of corresponding communication channels which are common to the units in each group, and in that the said master unit includes logical means for controlling the exchange of communications between the said channels.

BRIEF DESCRIPTION OF THE DRAWINGS

A particular embodiment of this invention will now be described purely by way of a non-restrictive example for the better understanding thereof with reference to the appended drawings in which:

FIG. 4 shows more detailed activation and control block diagrams in the master unit of the system in FIG. 1.

DETAILED DESCRIPTION OF THE INVENTION

The connection system according to this invention between various slave units and a master unit, and therefore between the various slave units via the master unit, applies to local transmission networks of the multiplex type, and conveniently to multiplex networks in motor vehicles, for example of the type described in abovementioned Italian patent application no. 67158-A/89 lodged on the 7 Mar. 1989, the contents of which are incorporated in the description by mere reference where necessary.

Figure 1:
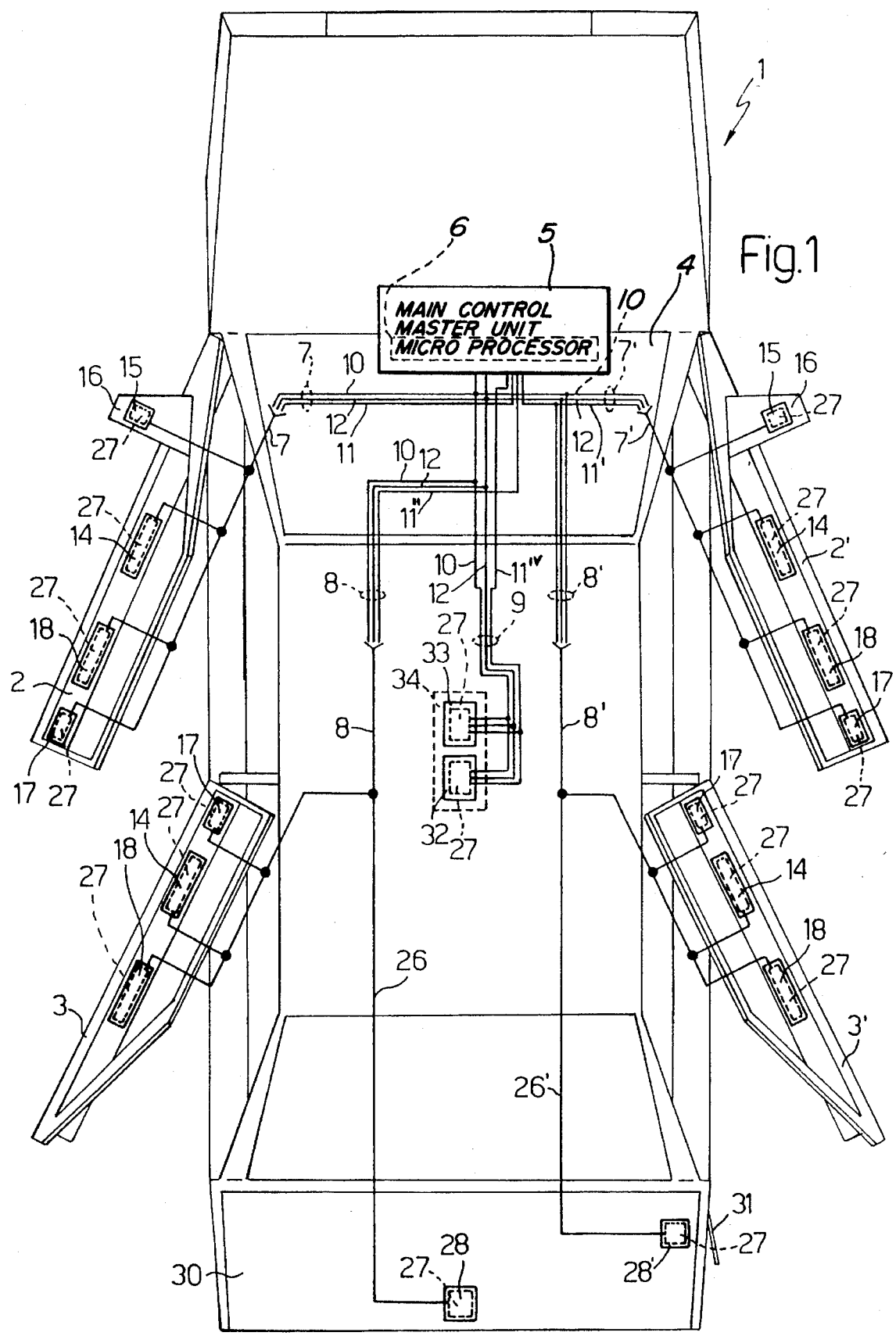
FIG. 1 is a diagrammatical view from the top of a motor vehicle incorporating the connection system for the activation and control of a plurality of electrical devices constructed in accordance with the invention.

FIG. 1 therefore illustrates a motor vehicle 1 which includes actuated devices provided with corresponding slave units connected with a master unit by multiplex connections forming a connection system according to this invention. This motor vehicle 1 has two front doors 2 and 2', and two rear doors 3 and 3', shown in the open position. A main control master unit 5 incorporating a microprocessor 6 is mounted close to dashboard 4, and from this run cables 7, 7', 8 and 8', and 9 respectively, each of which consists of a first conductor 10 for a positive electrical supply at a power level, a second data signal transmission conductor 11 and third conductor 12 providing a connection to earth.

Cables 7 and 7' respectively run to front doors 2 and 2', while cables 8 and 8' run to rear doors 3 and 3'. Each of these cables is connected progressively with corresponding branches to three conductors, one corresponding slave unit 27 which is associated respectively with a manual control switch device 14, a device 15 for the electrical control of an outside rear-view mirror 16, a door locking device 17, and a window winding device 18, for the activation and control thereof. In particular this slave unit 27 conveniently includes a printed circuit to which are connected a first integrated circuit for distribution of the electrical power supply to an activating component (for example a small direct current electric motor) of the corresponding device with which slave unit 27 is associated, and a second integrated circuit for processing data signals relating to the functioning of that component. This first and second integrated circuit form a logical unit and may conveniently include specific logic circuits or a microprocessor, solid state switches, etc., and may construct circuits for protection against current and voltage overloads, control and diagnostic circuits, etc.

In the case of device 14 with manual control switches the first integrated circuit is missing, in that there is no power activation, whereas in the case of device 15 for electrical control of the outside rear-view mirror 16 there will be more than one activating member, in that the various electrical components actuating orientation movements of the reflecting surface of the rear-view mirror, for altering the orientation of the rearview mirror body with respect to the door, mat be controlled, and a supply may be provided to the components heating the reflecting surface.

In the case of cables 8 and 8' for doors 3 and 3' the connection with electrical control device 15 for outside rear-view mirror 16 will obviously be missing. Cable 8 also passes by means of a branch 26 to a slave unit 27 belonging to a device 28, similar to device 17, for locking and releasing a boot 30, while cable 8' passes via a branch 26' to a slave unit 27 belonging to a device 28', also similar to device 17, for locking and releasing a flap 31 providing access to a fuel filler cap for motor vehicle 1.

Cable 9 in turn is progressively connected by means of corresponding branches to three conductors, two relating to slave units 27 associated respectively with a first and a second manual control switch device 32 and 33, placed in a zone 34 (console) between the front seats, capable of controlling devices 15 for electrical control of external rear-view mirrors 16 and window winding devices 18.

Figure 2:
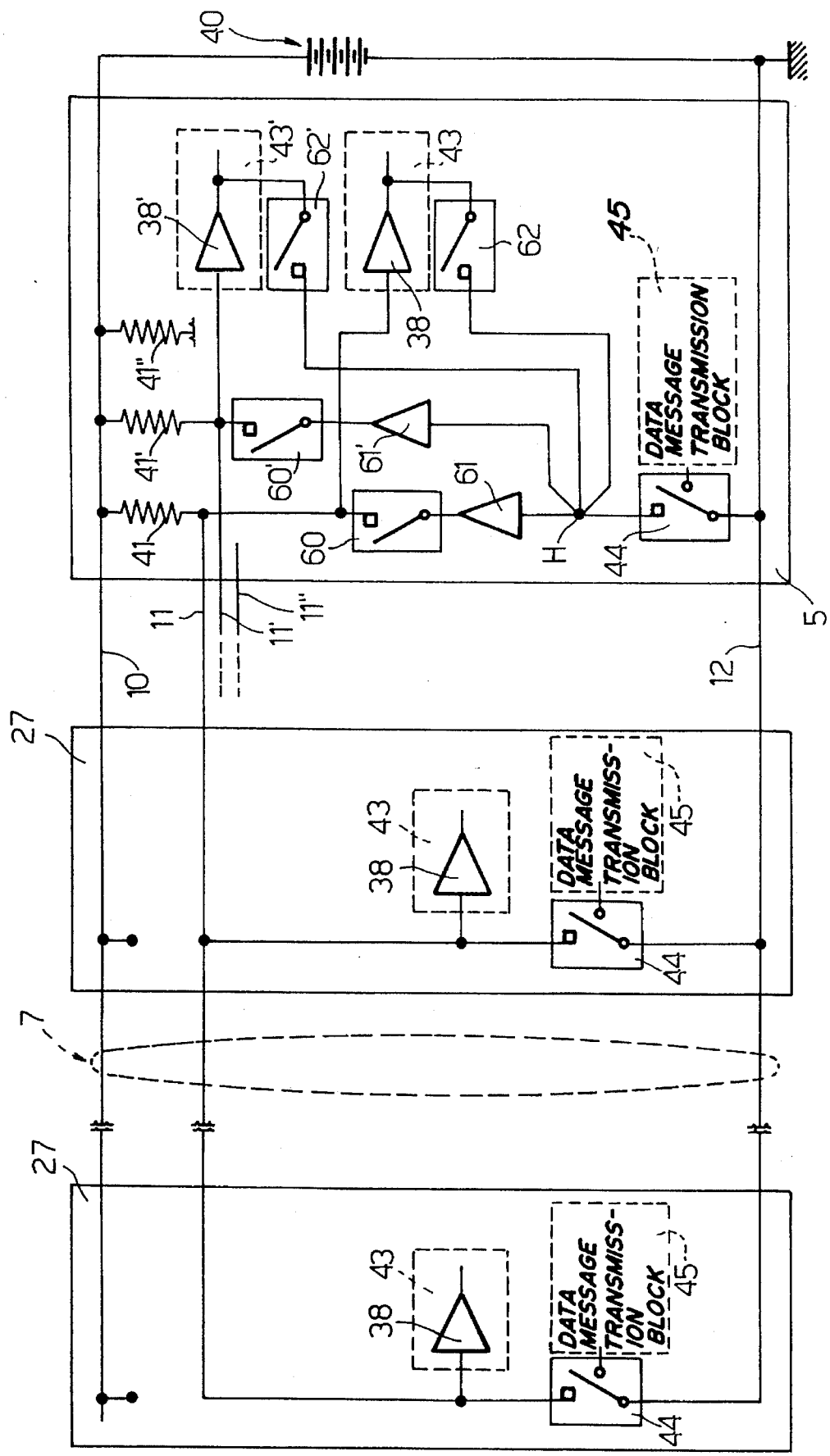
FIG. 2 is a simplified block diagram of the connections between various units in the system in FIG. 1.

As is illustrated in greater detail in FIG. 2, the main control master unit 5 which is connected to a supply battery 40 is in turn connected to slave units 27 attached for example to cable branch 7 by means of conductor 10 providing a positive electrical power supply, a conductor 11 for the transmission of data signals and a conductor 12 providing a connection to earth. Connection of the various slave units 27 to transmission conductor 11 is of the "wired and" type, in which a return resistor 41 is connected between conductor 11 and positive supply conductor 10 in master unit 5, so that the dominant logical level is a "low" logic level, and is subject to any of the units which initiates transmission. In both master unit 5 and slave units 27 transmission conductor 11 is in fact connected to the input of a corresponding amplifier 38 of a data receiving block 43, while a switch block 44 which is controlled by a data message transmission block 45 is placed directly between transmission conductor 11 and earth conductor 12 in slave units 27, and a first block 60 with an auxiliary switch controlled in a manner which will be described is inserted in the master unit in series with a transmission amplifier block 61 which is in turn connected to a terminal H of switch block 44 which is connected with its other terminal to earth and is controlled by data message transmission block 45. A second auxiliary switch block 62, again controlled in the manner which will be described is connected between the output of data receiving block 43 and terminal H. These blocks 43 and 45 form the logic means of slave units 27 constructed of logic circuits, while in master unit 5 these consist of microprocessor 6. Coding for unit information is therefore performed by means of switch block 44, of the type modulating the duration of pulses of constant amplitude equal to the supply voltage. Logical value "1" is encoded by a high/low ratio of greater than unity, and vice versa for logical level "0".

The connection structure described with the return resistor, the auxiliary switch blocks and the data receiving blocks are repeated in master unit 5 for the other communication conductors 11, 11', 11", . . ., for the other cables, and corresponding members are indicated by the same numbers and indices.

The overall connection structure in master unit 5 is illustrated in detail in FIG. 4, in which in addition to a repetition of what has already been partly illustrated in FIG. 2 the outputs of the various data receiving amplifiers 38, 38', 38", . . ., are connected to the corresponding inputs of block 86 which, depending on the programmed control logic of microprocessor 6, direct signals to outputs 77, 78 and 79 which pass to the corresponding inputs of a decoding block 80, which has corresponding first outputs 81, 81", 81", . . ., which control the corresponding first auxiliary switch blocks 60, 60', 60", . . ., second outputs 82, 82', 82", . . ., which control the corresponding second auxiliary switch blocks 62, 62', 62", . . ., and an output 83 for controlling the state of the principal transmission switch block 44.

Figure 3:
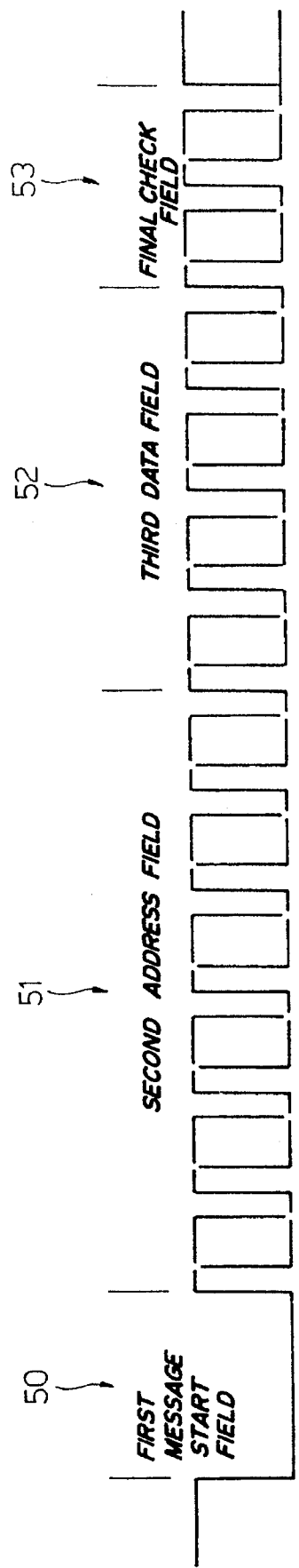
FIG. 3 is an illustration of a communication message between units in the system in FIG. 1.

The message sent by any one of units 5 or 27 along transmission conductor 11 has the characteristic time course illustrated in FIG. 3 as described in the Italian patent application lodged on the same date by the same applicant entitled: "System for communication between a master and slave processing units", the contents of which are incorporated with the description here by mere reference where necessary. In particular, from a "high" resting level for conductor 11, in which the transmission line is not occupied, there is a first message start field 50 in which transmission conductor 11 is altered to a low level by closing switch block 44 controlled by transmission block 45 of the corresponding unit initiating the exchange (auxiliary switch block 60 is assumed closed in master unit 5), then there is a second address field 51 conveniently consisting of six bits in order to identify slave unit 27 which is transmitting, the logic level "1" or "0" is given by modulation of the closing time for switch block 44 controlled by block 45, then there is a third data field 52 consisting conveniently of four bit code for the command or message which is transmitted, and a final check field 53 conveniently consisting of two redundant bits in order to check that the message received is correct. Finally the transmission line is released by the unit transmitting and the signal on transmission conductor 11 returns to the "high" rest level.

With the connecting system according to this invention messages exchanged are sent along all the communication lines which end at master unit 5. A message is transmitted from master unit 5 to slave units 27 merely by commanding all auxiliary switch blocks 60, 60', 60", . . ., by outputs 81, 81', 81", . . ., (FIG. 4), through which all the various transmission conductors 11, 11', 11", . . ., are connected to main transmission switch 44 which is controlled by output 83. Under the conditions where messages are being received by one of slave units 27 master unit 5 in turn transfers the data to all the communication lines. In fact, assuming that transmission conductor 11 is occupied by the initial field 50 (FIG. 3) of a message from a connected slave unit 27, it is then changed to a logic level "0" and node K at the output of receiver 38 is also changed to that level. Microprocessor 6 therefore recognises the, change to a low logic level in that node K, while the other nodes K', K", . . . , remain at a high logic level, through which the closure of switch block, 62 and the opening of switch block 60, and the opening of switch block 62', 62", . . ., and the closing of switch blocks 60', 60", . . ., is controlled via block 80 and the corresponding outputs. In this way the signal received on conductor line 11 is retransmitted via node H to all other conductor lines 11', 11", . . . . The above characteristic according to this invention has the advantages that:

- it avoids the possibility of simultaneous multiple transmissions from the slave units to the master unit, thus simplifying handling by master unit 5. Each slave unit 27 connected to any communication line finding a message in progress on the communication conductor avoids initiating a new transmission. Known techniques of allocation of the communication line for transmissions initiated simultaneously are also possible,
- it makes it possible for the system to be expanded. In fact several master units can be connected together by means of communication lines if the interchange of messages between the various branches is permitted by means of the transparent operation (active repeater) of each central node.

With the connection system according to this invention there is no direct echo from any message received on any of the communication lines, which would cause serious disadvantages. As, as already said, the "low" logic level is imposed by any one of the units sending a message on the corresponding communication conductor, when master unit 5 finds a "low" level on one of communication conductors 11 it imposes the same level on all the communication lines including the original line, and in fact it is no longer possible to detect the "high" logic level on the first communication line when the slave unit has finished sending its message.

A communication line is considered to be faulty by master unit 5 when:

the level of communication conductor 11 remains in the "low" state (dominant) for a time longer than a pre-specified maximum (caused for example by a short circuit to earth), the level on communication conductor 11 remains in the "high" (recessive) state detected by master unit 5 at corresponding mode K, even when unit 5 itself attempts to impose a "low" state (caused for example by a short circuit in the supply voltage), the messages received from one communication line fail to conform because the time is greater than a predetermined maximum (caused for example by a malfunctioning slave unit).

In all these cases master unit 5 disables the communication line which is considered to be faulty commanding blocks 60, 60', 60", . . . , to be opened via block 80 and the corresponding output of 81, 81', 81", . . . , in order to interrupt transmission to the said line. The signals present at the corresponding node K, K', K", . . . , may also be ignored by master unit 5.

The connection system according to this invention is therefore configured in the form of a "star" system in which a plurality of groups of secondary units are connected to corresponding communication lines which are in turn connected to the master unit, but with a limited number of communication lines which originate from master unit 5 and to which various slave units 27 are connected in multiplex form therefore avoiding the disadvantages inherent in "star" systems with individual communication lines for the various slave units, and systems with a single line communication common to all the slave units. In addition to this, because independent operation of all the communication lines would be complicated and therefore slow (requiring complex operation by master unit 5), and frequently unnecessary, in accordance with this invention the master unit 5 controls each communication line by means of a transmitter/receiver circuit dedicated to it controlled by a more complex control logic unit (for example a microprocessor) as illustrated in FIG. 4, nevertheless maintaining the possibility of controlling each one of the communication lines independently of the others, thus ensuring that a fault on one communication line only puts one sector of slave units out of service.

The advantages of the connection system according to this invention are obvious from what has been described, in particular:

because there is a limited number of communication lines leaving master unit 5, to which various slave units 27 are connected in multiplex form, cabling and installation costs are reduced, with a particularly important advantage in applications in motor vehicles, such as that illustrated in FIG. 1, each communication line in the "star" arrangement may be operated integrally with the others (echo function) or left free under the control of the logic unit included in master unit 5. This makes it possible to:

a) minimize handling by master unit 5,
b) provide timely access to the communication line and allocation procedures even from slave units resident on different communication lines,
c) make it possible to connect together several master units,
d) provide a simple procedure for fault identification and isolation of the corresponding communication lines.

Finally it is clear that modifications or variants may be applied to the embodiment of the invention described and illustrated without going beyond the scope of the inventive concept included therein. For example the number and the arrangement of the connected devices indicated by way of example may be varied, as well as the circuit configurations which have been illustrated by way of example in diagrams.

We claim:

1. A connection system between a central unit and a plurality of peripheral units, comprising:

a plurality of communication channels, each communication channel connecting a predetermined group of peripheral units to said central unit;

a microprocessor disposed in said central unit for controlling the exchange of communication between said central unit and each of said predetermined groups of peripheral units on each of said communication channels connected to said predetermined group;

a plurality of first switches disposed in said central unit, each of said first switches being connected to a respective one of said plurality of communication channels, each first switch being responsive to said microprocessor for enabling transmissions on its respective communication channel; and a plurality of second switches disposed in said central unit, each second switch having a first terminal connected to a respective one of said plurality of communication channels and a second terminal connected to each of said plurality of first switches, said second switches enabling communication between its respective communication channel and each of said plurality of first switches.

2. A connection system, comprising:

a plurality of groups of interconnected peripheral units, each peripheral unit sending electrical signals to and receiving electrical signals from at least one other of said groups of peripheral units;

a plurality of communication channels for receiving and transmitting electrical signals, each group of said plurality of groups of peripheral units being connected to a respective one of said plurality of communication channels, each of said groups adapted to independently and directly transmit and receive electrical signals to and from a central unit on a respective one of said plurality of communication channels;

said central unit being connected to said plurality of communication channels, wherein each communication channel is connected to a respective one of said plurality of peripheral units, said central unit further including:

a plurality of central unit receiver means each being connected to a respective one of said plurality of communication channels for receiving an electrical signal transmitted by one of said peripheral units on a respective communication channel, a plurality of central unit transmitter means each being connected to a respective one of said plurality of communication channels for transmitting an electrical signal on a respective communication channel, and logic means for detecting and decoding a transmitted signal from a transmitting peripheral unit to determine the identity of said transmitting unit and for routing said transmitted signal to all other of said plurality of peripheral units to the exclusion of said transmitting unit.

3. The system according to claim 2, said logic means further including detector means capable of comparing a logic level on a communication channel of said transmitting unit to a predetermined logic level and detecting whether said logic level on said transmitting unit is anomalous in its value and duration as compared to said predetermined logic level, said logic means further adapted to command interruption of transmission on said transmitting communication channel.

4. The system according to claim 2, wherein said logic means routes said electrical signal transmitted by said transmitting peripheral unit by means of an asynchronous serial protocol.

5. The system according to claim 4, wherein said signal is comprised of pulses of constant height, and said logic means routes said electrical signal transmitted by said transmitting peripheral unit by modulating the duration of said pulses of constant height.

6. The system according to claim 2 said peripheral units being ten in number.

7. The system according to claim 2 further comprising at least two central units connected together by means of a communication channel.

8. The system as set forth in claim 2, wherein said central unit logic means further includes a microprocessor.

9. The system as set forth in claim 2, wherein said transmitting peripheral unit transmits asynchronous serial signals.

10. The system as set forth in claim 2, further comprising a plurality of electrical devices, each electrical device being electrically connected to a particular peripheral unit.

11. The system as set forth in claim 10, wherein said electrical device is electrically connected to an activation component for activating said electrical device, said peripheral unit further including means for receiving data from said activating device and means for supplying power to said activating device.

12. The system as set forth in claim 2, wherein each of said plurality of communication channels is a cable comprised of a power line, a ground line and a data line.

* * * * *